United States Patent Office 3,421,766
Patented Jan. 14, 1969

3,421,766
COMPOSITION OF MATTER AND GOLF BALL MADE THEREFROM
Chester T. Chmiel, Newfoundland, N.J., and Harry S. Witt, Naugatuck, Conn., assignors to Uniroyal, Inc., a corporation of New Jersey
No Drawing. Filed Dec. 13, 1965, Ser. No. 513,539
U.S. Cl. 273—218  9 Claims
Int. Cl. A63b 37/00

ABSTRACT OF THE DISCLOSURE

This invention relates both to a composition of matter and a unit construction or solid golf ball made therefrom. The composition, which is comprised of (1) a polybutadiene elastomer, (2) an ionomer, (3) a thermoplastic resinous material other than an ionomer, (4) filler, (5) a polyfunctional co-curing monomer ester having at least two non-conjugated ethylenic double bonds, (6) and a source of free radicals.

---

This invention relates to a new composition of matter and to a solid golf ball made therefrom which has many advantages over the conventional wound golf ball. The material costs in forming the solid golf balls of our invention are considerably less than those incurred in making the conventional wound ball. The operation of making the solid golf balls of our invention is simpler, eliminating such steps as thread formation and winding, center formation, cover molding, and emulsion curing. By eliminating these steps, the production savings brought about by the present invention are considerable.

It is one object of this invention to produce a new composition of matter and solid golf balls made therefrom which possess improved properties and are much cheaper to manufacture than conventional wound golf balls. Another object is to provide a golf ball which is suitable either for driving range use or for use on the ordinary golf course.

In its broadest aspects, our invention is a uniform homogeneous mixture comprising cis-1,4-polybutadiene, an ionomer, a compatible thermoplastic resinous material other than an ionomer, filler (by which term we include both fillers and pigments), a polyfunctional co-curing monomer ester having at least two non-conjugated ethylenic double bonds, and a source of free radicals. Our invention embodies such a composition in both uncured and cured forms.

In its narrower aspects, our invention is a solid golf ball which comprises a cured spherical body, exhibiting the conventional dimpled surface and having the conventional diameter (approximately 1.680 inches) and otherwise meeting standard golf ball specifications, formed of a cured uniform homogeneous mixture having the composition just described broadly and described in detail below.

Cis-1,4-polybutadiene rubber constitutes the principal component in our golf balls. This material is a well-known commercial polymer, made by polymerizing butadiene under such conditions that the resulting polymer has at least 85% of the butadiene content in the form of the cis-1,4-isomer. Generally more than 95% of the butadiene units are combined in the cis-1,4 isomeric configuration. Any of the commercially available cis-1,4-polybutadiene rubbers having at least 85% cis-1,4 structure, and preferably having at least 95% cis-1,4 structure, can be used in the practice of our invention.

In describing our invention we find it convenient to express the proportions of the other components as parts by weight based on 100 parts by weight of the cis-1,4-polybutadiene. To the best of our knowledge, it is necessary to use cis-1,4-polybutadiene as the principal polymeric material in our balls, one reason for this being that cis-1,4-polybutadiene exhibits an extremely high rebound so that, after the other necessary ingredients, namely the ionomer, the other thermoplastic resinous material, the fillers, the co-curing ester, and the source of free radicals have been incorporated in order to increase the compression and click properties to the desired level, the resulting ball has the required rebound of about 70%.

The ionomer component of our balls is a well-known material, being described in detail in French Patent No. 1,393,730 delivré Feb. 15, 1965 and in Canadian Patents No. 674,595, granted Nov. 19, 1963, and No. 713,631, granted July 13, 1965 corresponding to said French patent, the disclosures of said French and Canadian patents being hereby incorporated herein by reference. The term "ionomer" has recently been introduced in the art to designate an ionic copolymer of at least 50 mole percent of one or more alpha-olefins together with a lesser proportion of an alpha, beta ethylenically unsaturated monocarboxylic acid or dicarboxylic acid, the acid monomer content of said copolymer being from 0.2 to 25 mole-percent, said copolymer containing uniformly distributed throughout the copolymer a metal ion having an ionized valence of 1 to 3 inclusive in monocarboxylic acid-containing ionomers and a valence of 1 in dicarboxylic acid-containing ionomers. At least 10 percent of the carboxylic acid groups of the copolymer are neutralized by the metal ions and exist in the ionic state. Ionomers based on copolymers of ethylene and acrylic or methacrylic acid are most common. The metal ions are commonly ions of metals of Groups I, II, III, IV–A and VIII of the Periodic Table, the more common ones being ions of the alkali metals such as sodium and potassium, and the alkaline earth metals such as calcium, strontium, barium and such commonly available metals as zinc and aluminum. The ionomers are hard, transparent, resinous thermoplastic materials. Ionomers are described in articles appearing in Modern Plastics, September, 1964, pages 98–99, 209–210, Modern Plastics, March, 1965, pages 135–137, 140 and 198 and in "Polymer Preprints, American Chemical Society, Division of Polymer Chemistry, Papers Presented at the Detroit Meeting, April 1965," Volume 6, No. 1, pages 287–303.

The preferred ionomers used in the practice of our invention are those known in the trade as "Surlyn A," these being ionic copolymers of approximately 96.5 mole-percent of ethylene and 3.5 mole-percent of methacrylic acid, sodium or zinc ions being uniformly distributed throughout the copolymer to an extent representing about 50% neutralization of the methacrylic acid. Although the exact interactions between the metallic ions and the copolymer are not completely understood, it is presumed that an ionic attraction exists between the metal ion and one or more ionized carboxylic acid groups. Since these ionized carboxylic acid groups may exist on different polymeric chains, a form of cross-linking occurs in the solid state. In a molten state or when subjected to shear, these ionic crosslinks are ruptured, allowing the ionomer to be fabricated essentially as an uncrosslinked linear polymer. Upon cooling or removal of the stress, the ionic crosslinks are reformed and the ionomer again exhibits crosslink character.

We generally employ from 20 to 80 parts of the ionomer per 100 parts of cis-1,4-polybutadiene. Such properties of the resulting solid golf ball as compression, rebound and cut resistance are affected by changes in the amount of the ionomer. The amount of ionomer incorporated depends on the amount of the other ingredients and on the properties desired in the final ball. For example, when the amounts of all of the other ingredients in a formulation are maintained constant, the compression and cut resistance of the solid ball will increase, whereas the rebound will decrease, as the amount of ionomer is increased. The sound intensity of the ball when struck increases when the ionomer content is increased.

The critical nature of the use of the ionomer in our ball is shown by the fact that substitution of ordinary or unmodified polyethylene for the ionomer in solid golf ball formulations of our invention produces balls possessing rebounds and compression significantly lower than those found in balls prepared from formulations incorporating the ionomer.

The second resinous component of the solid golf balls of our invention preferably is a resinous copolymer of a major proportion of styrene and a minor proportion of acrylonitrile. Somewhat less preferably it may be a resinous copolymer of a major proportion of styrene and a minor proportion of butadiene. Other thermoplastic resinous materials which still less preferably may be employed are polyvinyl chloride, polystyrene, polymethylmethacrylate, etc. Although our experimental work has demonstrated that polyethylene is a very poor replacement for the ionomer component of our invention, polyethylene can be used as a resinous material to be incorporated in place of the preferred styrene-acrylonitrile resinous copolymer or the somewhat less preferred styrene-butadiene resinous copolymer.

A one-to-one replacement of a given second resinous component with another such component does not necessarily produce a ball possessing the same properties; thus, replacement of a styrene-acrylonitrile resin with the same weight of a styrene-butadiene resin produces a ball with higher compression, reduced rebound and improved cut resistance; adjustments in amounts of the other components may be necessary in order to produce a golf ball with the required properties. Those skilled in the art can readily produce satisfactory solid golf balls following the teachings of this specification.

The amount of the second thermoplastic resinous component used in our balls can rangs widely, but preferably is between 5 and 50 parts per 100 parts of cis-1,4-polybutadiene. Such properties of the solid golf ball as compression, rebound and cut resistance are affected by changes in the amount of this component. The amount of this ingredient incorporated into a given blend depends upon the amounts of the other ingredients used and on the properties desired in the final ball. For example, when the amounts of all of the other ingredients in a given formulation are maintained constant, an increase in the content of a styrene-acrylonitrile resinous copolymer brings about an increase in the compression of the resulting solid ball but a decrease in rebound and cut resistance; but again holding amounts of all other materials constant, an increase in the amount of a styrene-butadiene resin, in contrast, gives an increase in compression, a decrease in rebound and an increase in cut resistance. The amount of styrene-butadiene resin used will usually be between 5 and 30 parts per 100 parts of cis-1,4-polybutadiene.

The resinous copolymer of styrene and acrylonitrile preferably used as the second resinous component of the golf balls of our invention is a well-known article of commerce. Typically this component is a copolymer of 70 weight-percent of styrene and 30 weight-percent of acrylonitrile. However, the relative proportions of these two monomers can range within limits of from 60 to 90 weight-percent of styrene and correspondingly 40 to 10 weight-percent of acrylonitrile. In several of the working examples below we use a copolymer of 70% styrene and 30% acrylonitrile known as "Kralac 1155."

The resinous copolymer of styrene and butadiene somewhat less preferably used as the second resinous component also is a well-known article of commerce. Typically it is a copolymer of 85 weight-percent of styrene and 15 weight-percent of butadiene. However, the relative proportions of these monomers can range within limits of from 60 to 90 weight-percent of styrene. In Example 5 below we use a copolymer of 85% styrene and 15% butadiene known as "Naugapol KA."

We find that where high compression, high rebound and good click properties are desirable, as in a premium ball, the combination of ionomer and styrene-acrylonitrile resin is more successful than the combination of ionomer and styrene-butadiene resin. On the other hand, for driving range balls where high cutting resistance and durability are important, the combination of ionomer and styrene-butadiene resin is better. The ionomer must be used in combination with either type of resin in order to raise the compression to acceptable levels without excessively compromising rebound, and in order to secure acceptable values for compression and rebound at co-curing ester levels substantially below 25%.

Fillers, by which we mean both materials known strictly as fillers as well as materials added for their pigmenting value, particularly white pigments such as titanium dioxide, are an important component of the golf balls of our invention. These fillers can be any of the known inorganic fillers commonly used in rubber and plastic compositions, examples of such inorganic fillers being precipitated hydrated silica such as the material known in the art as "HiSil," precipitated hydrated calcium silicate such as the material known in the art as "Silene EF," titanium dioxide which is particularly valuable because of the great whiteness which it imparts to the balls, talc (which chemically is magnesium silicate), and zinc oxide. We generally use a plurality of fillers, one of them being titanium dioxide for its whiteness.

Based on 100 parts of cis-1,4-polybutadiene, we generally use from 30 to 70 parts of total fillers. Compression, rebound and cut resistance are affected by these fillers. The amounts of these fillers incorporated into a blend depend on the amounts of the other ingredients to be introduced and on the properties desired in the final ball. For example, when the amounts of all of the other ingredients in the formulation are maintained constant, the compression of the ball increases with an increase in filler level whereas rebound and cut resistance decrease.

As will be obvious to those skilled in the art, we are not restricted to the fillers named above. Other materials, such as calcium carbonate and calcium metasilicate, are effective fillers. A one-to-one replacement of one filler with another does not necessarily produce a ball possessing the same properties; adjustment in amounts of the other ingredients may be necessary in order to produce a golf ball with the required properties.

We generally use from 10 to 30 parts of titanium dioxide per 100 parts of cis-1,4-polybutadiene. The properties of the ball are not too sensitive to changes in amount of this filler, and for the most part it acts as a white pigment and a weight regulator.

The polyfunctional co-curing monomer ester is a very important component of the balls of our invention since it imparts durability and higher compression to the ball. The co-curing monomer ester is a polyunsaturated ester derived from an alcohol and a carboxylic acid, of which components only one may have an ester-forming functionality greater than unity. The unsaturation may reside either in the acid or in the alcohol, or in both. Thus, saturated polyols (diols, triols, etc.), since they have an ester-forming functionality greater than one, may only be esterified with unsaturated monocarboxylic acids to form the polyunsaturated esters usable in the invention. Such materials are exemplified by the esters formed upon interaction of polyhydric alcohols, e.g., ethylene glycol, diethylene glycol, 1,3-butanediol, triethylene glycol, tetraethylene glycol, etc., glycerin, trimethylol propane, pentaerythritol, sorbitol, etc., with unsaturated monocarboxylic acids, e.g., acrylic acid, methacrylic acid, and other alkenoic acids. The alkenoic acids may also be esterified with monoolefinically unsaturated monohydric alcohols, that is, alkenols, such as allyl alcohol, methallyl alcohol, etc., to form esters usable in the invention, e.g., allyl methacrylate, etc. The alkenols may also be reacted with polycarboxylic acids, either saturated or olefinic, such as succinic, maleic, and fumaric acids, to give esters usable in the invention.

Polycarboxylic acids reacting with polyhydric alcohols would produce polymeric products possessing predominantly either acidic or alcoholic end groups which would serve as transfer agents in free-radical cures. These transfer reactions could interfere with rate and degree of cure. These objections would not apply for reaction products of monoolefinically unsaturated monohydric alcohols with polycarboxylic acids.

The preferred co-curing monomer esters are the polymethacrylate esters of the glycols, examples of these being ethylene glycol dimethacrylate (also known as ethylene dimethacrylate), 1,3-butanediol dimethacrylate (also known as 1,3-butylene dimethacrylate), triethylene glycol dimethacrylate (also known as ethylenedioxydiethylene dimethacrylate), tetraethylene glycol dimethacrylate (also known as oxydiethylenedi(oxyethylene) dimethacrylate), and trimethylol propane trimethacrylate.

The amount of the co-curing monomer ester used in practicing our invention can range from 1 to 25 parts (by weight) per 100 parts of cis-1,4-polybutadiene. The upper limit is imposed by reason of the fact that, with the amounts of resins used in the practice of our invention, use of more than 25 parts of the co-curing ester would produce a ball as hard as rock and having poor rebound.

The preferred source of free radicals is dicumyl peroxide. This is a well-known chemical of commerce and is commonly available under the designation "DiCup #40" which is dicumyl peroxide supported on calcium carbonate, there being 40% of peroxide and 60% of calcium carbonate in the product.

However, we are not limited to the use of dicumyl peroxide as the curing agent but can use other materials known to the art to be effective sources of free radicals for polymerization reactions, examples being other organic peroxides such as lauroyl peroxide, benzoyl peroxide, and t-butyl hydroperoxide, and other free radical sources such as azobis-isobutyronitrile, etc.

The amount of the source of free radicals used in the practice of our invention commonly ranges from 1 to 5 parts (by weight) per 100 parts of cis-1,4-polybutadiene. These ranges of course refer to the active component of the source of free radicals.

In making golf balls according to our invention, the several components are uniformly mixed together and the resulting mixture is then molded under conditions of heat and pressure such as to effect curing. We generally mix all of the components except the co-curing monomer ester and the source of free radicals on a conventional two-roll rubber mill or in a Banbury mixer at an elevated temperature of 250–300° F. We then allow this uniform mixture to cool down to below 125° F. and subsequently add the co-curing monomer ester and the source of free radicals on a cold two-roll rubber mill or in a cold Banbury mixer to form a uniformly admixed stock. The stock temperature during the latter incorporation is kept low, preferably at not over 125° F., in order to avoid premature reaction of the ester and the free-radical source. The resulting stock is then converted into blanks which may be in the form of cylindrical pellets or rough spheres having a volume slightly greater than that of the mold cavity. These blanks or preforms are then placed in golf ball mold cavities, typically 1.680 inches in diameter and provided with projections to impart dimpling, and are then molded under high pressure at a suitably elevated temperature to effect curing. Typically curing is effected by molding at 320° F. for 10 minutes in the mold cavity under a ram pressure corresponding to 2 tons for each four mold cavities, followed by a further curing for 30 minutes at the same temperature in the same press but with the pressure virtually zero. The resulting balls are cooled to below room temperature before removal, then the excess stock commonly called flash at the equator of the balls is removed by cutting and buffing, after which the balls are ready for use.

The following working Examples 1, 4, and 5 illustrate the invention in more detail. Examples 2 and 3 are included for purposes of comparison. The cis-1,4-polybutadiene rubber in every case was the brand manufactured by Phillips Petroleum Company.

EXAMPLE 1

This example illustrates the properties of golf balls formed when resins are incorporated into the blend. In the formulation which follows, cis-1,4-polybutadiene rubber, Surlyn A, Kralac 1155, ZnO, and Silene EF were mixed in a Banbury at 275°–280° F. The other ingredients were added to the Banbury mix on a cold two-roll mill.

The final mix was preformed at room temperature into rough spheres, each weighing not less than 52 grams, which spheres were then placed into cavities of golf ball mold platens and subjected to the following heating cycle:

320° F. for 10 minutes at 2 tons ram pressure, and 320° F. for 30 minutes at 0 tons ram pressure, following which they were cooled to below room temperature, and subsequently processed as described above.

Table 1

| Ingredients: | Parts by weight |
|---|---|
| cis-1,4-Polybutadiene | 100 |
| "Surlyn A" ER 1552 (sodium type) | 60 |
| "Kralac 1155" | 30 |
| "Silene EF" | 40 |
| Titanium dioxide | 20 |
| ZnO | 5 |
| "DiCup #40" | 10 |
| Ethylene glycol dimethacrylate | 2 |
| Properties: | |
| Rebound, percent | 70.5 |
| Compression, PGA meter | 90 |
| Cutting resistance, p.s.i. | 90 |

The properties of a conventionally wound high-priced distance or premium golf ball are:

Table 2

| Properties: | |
|---|---|
| Rebound, percent | 71.2 |
| Compression, PGA meter | 87 |
| Cutting resistance, p.s.i. | 51 |

A comparison of the properties of the balls in Tables 1 and 2 shows that our solid golf ball has properties similar to those possessed by a premium ball, with the added advantage that its cutting resistance is much higher. The sounds or clicks of the balls described in Table 1 and 2 are very similar.

EXAMPLE 2

This example illustrates the effect of ethylene glycol dimethacrylate on solid golf ball properties. The preparation of the mix was the same as described in Example 1 except that the ethylene glycol dimethacrylate was omitted. The curing cycle was the same as that described in Example 1. The resulting balls had the properties shown in Table 3.

Table 3

Properties:
  Rebound, percent _____ 70
  Compression, PGA meter _____ 81
  Cutting resistance, p.s.i. _____ 50

A comparison of the solid ball properties listed in Tables 1 and 3 shows that the introduction of ethylene glycol dimethacrylate increases the compression of the ball, but, more significantly, increases greatly its cutting resistance.

EXAMPLE 3

This example illustrates the effect of complete replacement of the ionomer used in Example 1 with an equal weight of ordinary unmodified polyethylene (of the type known as "DYNK"). The preparation of the mix and the subsequent steps were identical with those of Example 1 except for the substitution of 60 parts of the polyethylene for the 60 parts of "Surlyn A" used in Example 1. The resulting balls had the properties set forth in Table 4.

Table 4

Properties:
  Rebound, percent _____ 55.6
  Compression, PGA meter _____ 77

Comparison of Tables 2 and 4 shows that replacement of "SurlynA" by ordinary polyethylene results in a significant reduction of compression and a reduction of rebound to a level unacceptable either for ordinary golf course play or driving range use.

EXAMPLE 4

This example illustrates the effect of replacement of ethylene glycol dimethacrylate by 1,3-butanediol dimethacrylate. Mixing and molding procedures were the same as those described in Example 1.

TABLE 5

|  | Parts (weight) | |
| --- | --- | --- |
|  | 1 | 2 |
| Ingredients: |  |  |
| cis-1,4-polybutadiene | 100 | 100 |
| "Surlyn A" ER 1552 | 60 | 60 |
| "Kralac 1155" | 35 | 35 |
| "Silene EF" | 20 | 20 |
| Titanium dioxide | 20 | 20 |
| "DiCup #40" | 5 | 5 |
| Ethylene glycol dimethacrylate | 20 |  |
| 1,3-butanediol dimethacrylate |  | 20 |
| Properties: |  |  |
| Rebound, percent | 72.8 | 71.3 |
| Compression, PGA meter | 72.1 | 70 |
| Cutting Resistance, p.s.i. | 98 | 135 |

The data in Table 5 indicate that incorporation of either 1,3-butanediol dimethacrylate or ethylene glycol dimethacrylate into the mix produces balls having highly desirable properties.

EXAMPLE 5

This example illustrates the use of another resinous material, namely a styrene-butadiene resinous copolymer known as "Naugapol KA" in solid golf ball formulations containing "Surlyn A." Mixing and molding procedures were the same as those described in Example 1. The formulation is shown in Table 6.

Table 6

Ingredients: Parts weight
  cis-1,4-Polybutadiene _____ 100
  "Surlyn A" ER 1552 _____ 30
  "Naugapol KA" _____ 10
  "Silene EF" _____ 40
  Titanium dioxide _____ 20

"DiCup #40" _____ 10
  Ethylene glycol dimethacrylate _____ 10
Properties:
  Rebound, percent _____ 69
  Compression, PGA meter _____ 61
  Cutting resistance, p.s.i. _____ >140

This ball possesses the properties, including high cutting resistance, required of a driving range ball.

Substituting "Surlyn A" of type ER 1800, characterized by its containing zinc ions, for "Surlyn A" of type 1552, containing sodium ions, in the balls of our invention results in balls having essentially the same properties.

While we have described our invention with particular reference to a golf ball, we believe that the composition of matter described herein is novel and we therefore claim said composition broadly regardless of the form in which it is manifested.

Having thus described our invention, what we claim and desire to protect by Letters Patent is:

1. A solid golf ball comprising a cured spherical body of a uniform mixture comprising 100 parts by weight cis-1,4-polybutadiene having at least 85% cis-1,4 structure, 20–80 parts by weight of an ionomer based upon the copolymers of ethylene and acrylic or methacrylic acid, 5–50 parts by weight of a thermoplastic resinous material other than an ionomer, 30–70 parts by weight of an inert inorganic filler, 1–25 parts by weight of a polyfunctional co-curing monomer ester derived from an alcohol and a carboxylic acid of which components only one may have an ester forming functionality greater than unity, and 1–5 parts by weight of a free radical polymerization initiator selected from the group consisting of peroxides, hydroperoxides and azo compounds.

2. A solid golf ball as set forth in claim 1 wherein said ionomer is an ionic copolymer of about 96.5 mole-percent of ethylene and about 3.5 mole-percent of methacrylic acid, sodium or zinc ions being uniformly distributed throughout said copolymer to an extent representing about 50% neutralization of the methacrylic acid.

3. A solid golf ball as set forth in claim 1 wherein said co-curing monomer ester is ethylene glycol dimethacrylate.

4. A solid golf ball as set forth in claim 1 wherein said co-curing monomer ester is 1,3-butanediol dimethacrylate.

5. A solid golf ball as set forth in claim 1 wherein said ionomer is an ionic copolymer of about 96.5 mole percent of ethylene and about 3.5 mole-percent of methacrylic acid, sodium or zinc ions being uniformly distributed throughout said copolymer to an extent representing about 50% neutralization of the methacrylic acid, wherein said co-curing monomer ester is ethylene glycol dimethacrylate and wherein said source of free radicals is dicumyl peroxide.

6. A solid golf ball as set forth in claim 1 wherein said ionomer is an ionic copolymer of about 96.5 mole-percent of ethylene and about 3.5 mole-percent of methacrylic acid, sodium or zinc ions being uniformly distributed throughout said copolymer to an extent representing about 50% neutralization of the methacrylic acid, wherein said co-curing monomer ester is 1,3-butanediol dimethacrylate and wherein said source of free radicals is dicumyl peroxide.

7. A solid golf ball as set forth in claim 1 wherein said thermoplastic material other than an ionomer is a resinous copolymer of a major proportion of styrene and a minor proportion of acrylonitrile.

8. A solid golf ball as set forth in claim 1 wherein said thermoplastic material other than an ionomer is a resinous copolymer of a major proportion of a styrene and a minor proportion of butadiene.

9. A composition of matter which is a uniform homogeneous mixture of 100 parts by weight of cis-1,4-polybutadiene having at least 85% cis-1,4 structure, 20–80 parts by weight of an ionomer based upon the copolymers of ethylene and acrylic or methacrylic acid, 5–50 parts by weight of a thermoplastic resinous material other than an ionomer, 30–70 parts by weight of an inert inorganic fillers, 1–25 parts by weight of a polyfunctional co-curing monomer ester derived from an alcohol and a carboxylic acid of which components only one may have an ester forming functionality greater than unity, and 1–5 parts by weight of a free radical polymerization initiator selected from the group consisting of peroxides, hydroperoxides and azo compounds.

References Cited

UNITED STATES PATENTS

| | | | |
|---|---|---|---|
| 3,241,834 | 3/1966 | Stingley | 273—218 |
| 3,264,272 | 8/1966 | Rees | 260—785 |
| 3,313,545 | 5/1967 | Bartsch | 260—41.5 |

MORRIS LIEBMAN, *Primary Examiner.*

S. L. FOX, *Assistant Examiner.*

U.S. Cl. X.R.

260—41, 41.5, 889, 893, 894; 273—235